(12) United States Patent
Gupta

(10) Patent No.: US 10,306,580 B1
(45) Date of Patent: May 28, 2019

(54) SINGLE REGISTRATION MODE SUPPORT FOR INTERWORKING BETWEEN 5GC AND EPC

(71) Applicant: Intel IP Corporation, Santa Clara, CA (US)

(72) Inventor: Vivek G. Gupta, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/195,147

(22) Filed: Nov. 19, 2018

Related U.S. Application Data

(60) Provisional application No. 62/588,787, filed on Nov. 20, 2017.

(51) Int. Cl.
| | | |
|---|---|---|
| *H04W 8/02* | (2009.01) | |
| *H04W 36/00* | (2009.01) | |
| *H04W 36/14* | (2009.01) | |
| *H04W 60/00* | (2009.01) | |

(52) U.S. Cl.
CPC .......... *H04W 60/005* (2013.01); *H04W 8/02* (2013.01); *H04W 36/0033* (2013.01); *H04W 36/14* (2013.01)

(58) Field of Classification Search
None
See application file for complete search history.

(56) References Cited

U.S. PATENT DOCUMENTS

| | | | | |
|---|---|---|---|---|
| 8,515,465 B2 * | 8/2013 | Olsson | .................. | H04W 68/00 370/312 |
| 9,225,399 B2 * | 12/2015 | Shan | ..................... | H04W 28/24 |

* cited by examiner

*Primary Examiner* — Joshua L Schwartz
(74) *Attorney, Agent, or Firm* — Schwegman Lundberg & Woessner, P.A.

(57) ABSTRACT

Systems and methods of enabling intersystem changes between 4G and 5G are described. The UE in single registration mode handles default EPS bearer contexts and PDU session contexts as if the N26 interface were supported before making the determination whether N26 interface is supported or not during an initial EPS Attach procedure. After determining that the N26 interface is unsupported, the UE maps active PDU session contexts to default EPS bearer contexts and modifies the PDU session context state from active to inactive before completing the intersystem change. The UE either acts as if the N26 interface were supported and loses all the PDN connections or PDU sessions during the intersystem change, or enters a modified single registration mode in which the states of the EPC and 5G system are partially isolated from each other during the intersystem change.

23 Claims, 9 Drawing Sheets

SINGLE REGISTRATION MODE SUPPORT FOR INTERWORKING BETWEEN 5GC AND EPC

PRIORITY CLAIM

This application claims the benefit of priority under 35 U.S.C. 119(e) to U.S. Provisional Patent Application Ser. No. 62/588,787, filed Nov. 20, 2017, which is incorporated herein by reference in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, 4th generation (4G) networks and 5th generation (5G) networks. Some embodiments relate to improvements in interworking between heterogeneous communication networks.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. While the advent of any new technology, especially the introduction of a complex new communication system engenders a large number of problems both in the system itself and in compatibility with previous systems and devices, issues continue to abound in existing systems. For example, registration issues may occur when the UE is capable of registering both with a 4G/LTE network and a next generation/5G network.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Figure 1:
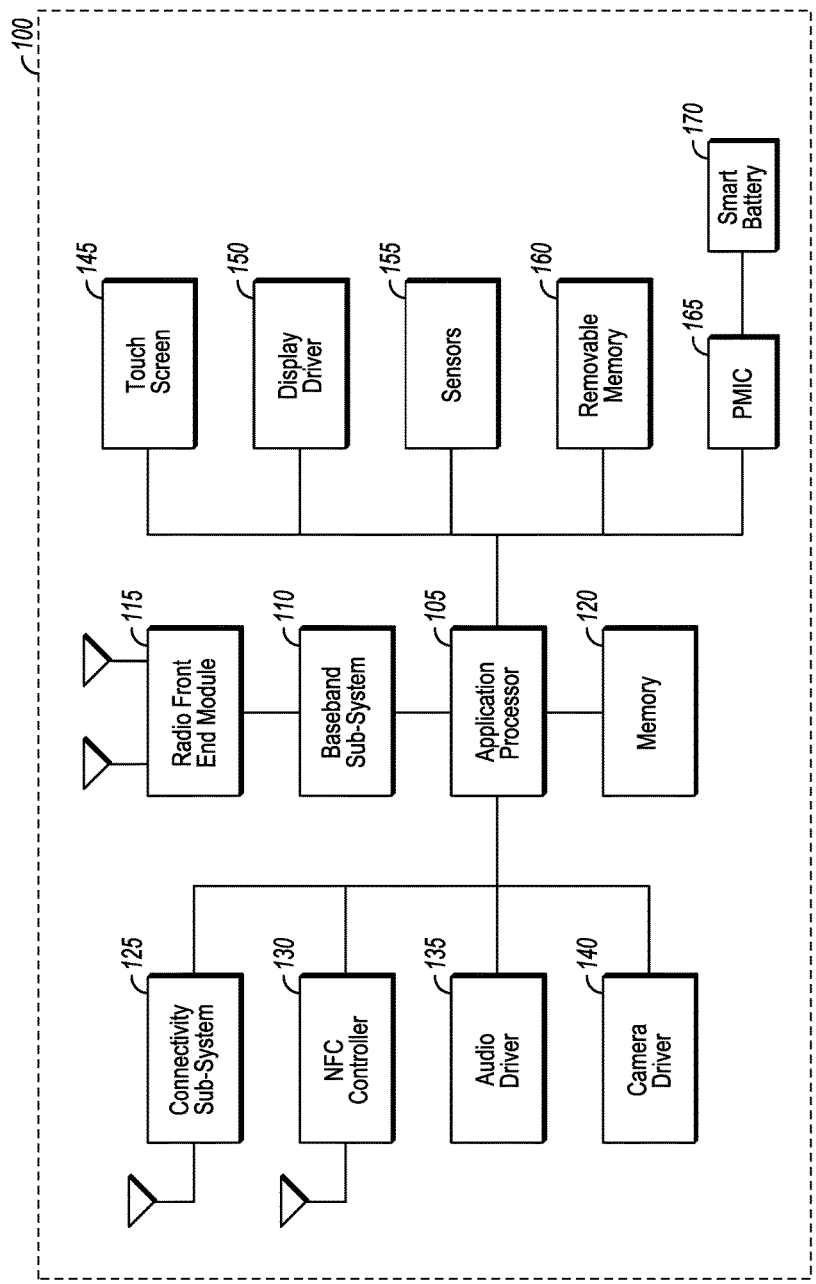
FIG. 1 illustrates a UE in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
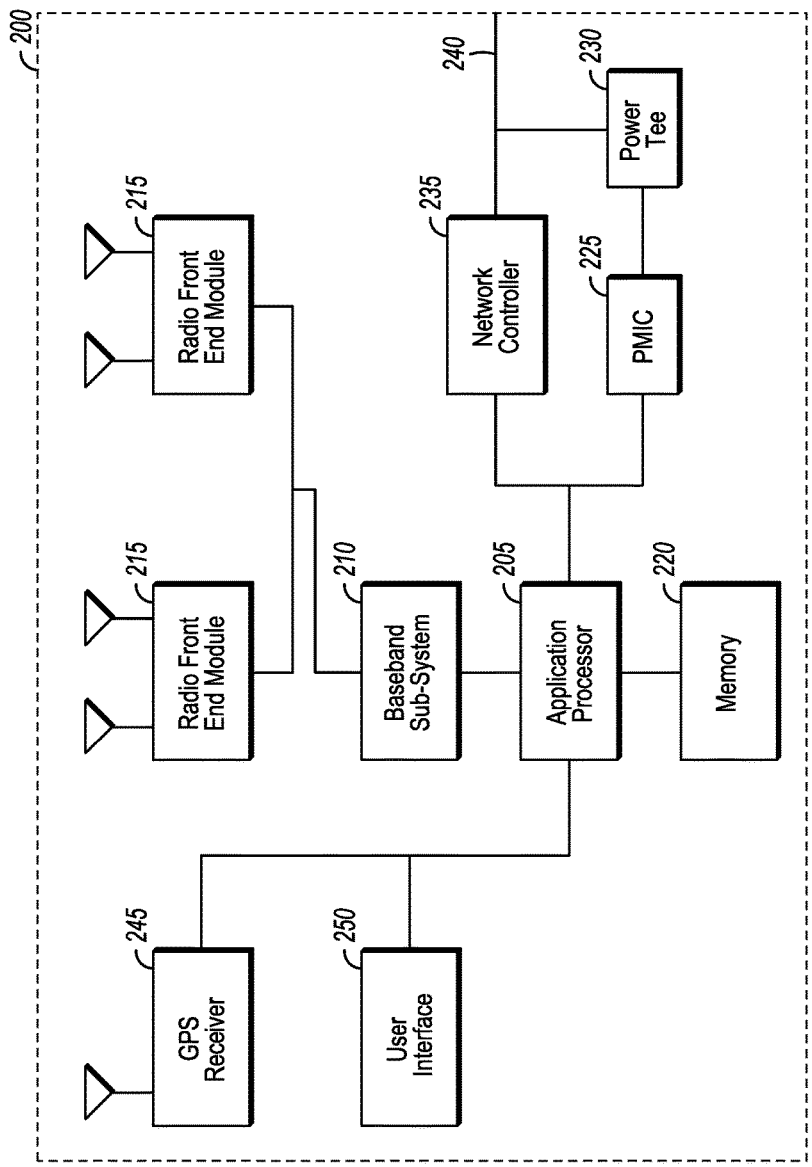
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, $I^2C$ or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
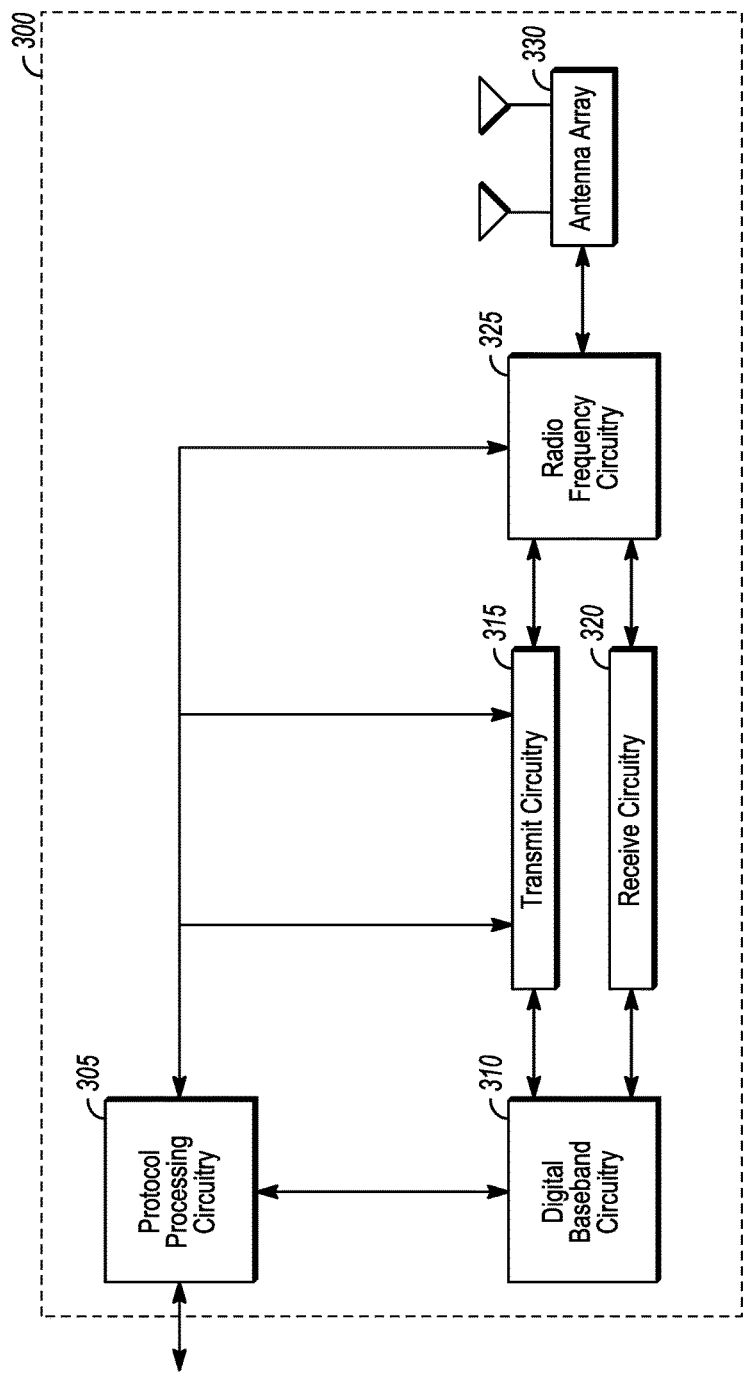
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect sub-system, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
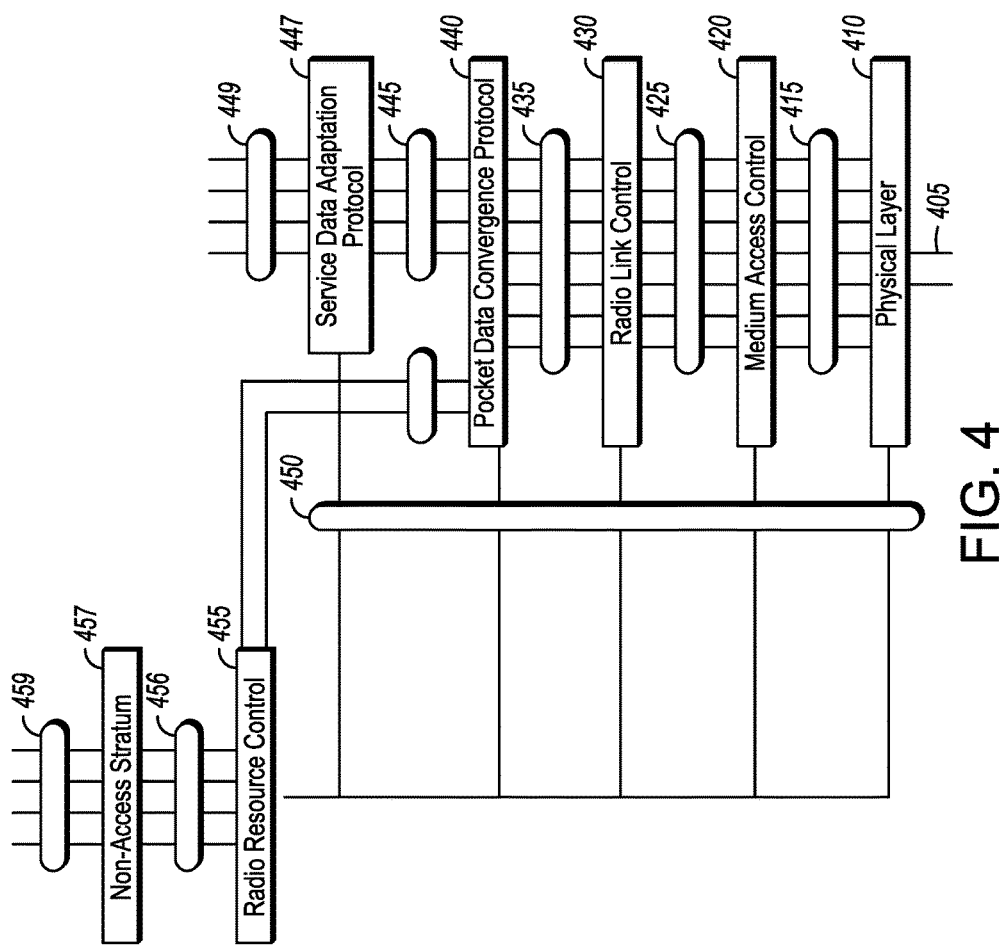
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
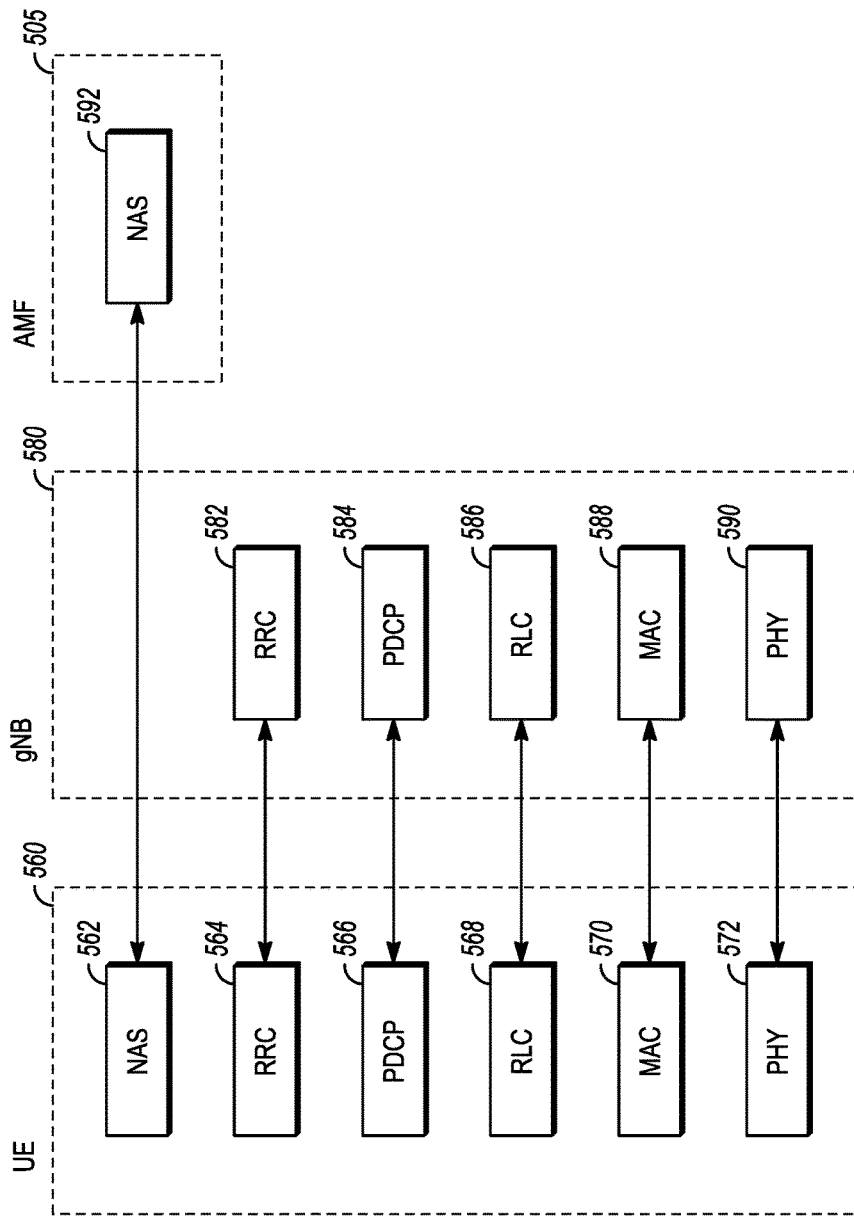
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) server 505 or session management function (SMF) server 507, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and SGNB RLC 586. According to some aspects, UE RRC 564 and gNB RRC 582 may communicate using the services provided respectively by UE PDCP 566 and gNB PDCP 584. According to some aspects, UE mobility management (MM) NAS 562 and AMF MM NAS 592 may communicate using the services provided respectively by UE RRC 564 and gNB RRC 582. Similarly, UE session management (SM) NAS 574 and SMF SM NAS 594 may communicate.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as 1/(30, 720×1000) seconds. According to some aspects, a radio frame may be defined as having duration 30,720·$T_s$, and a slot may be defined as having duration 15,360·$T_s$. According to some aspects, $T_s$ may be defined as $$T_s = 1/(\Delta f_{max} \cdot N_f),$$

where $\Delta f_{max}$=480×10³ and Nf=4,096. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i)=d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to $M_{symb}^{layer}-1$ the output is represented as a block of vectors:

$$[z^{(0)}(i) \ldots z^{(P-1)}(i)]^T$$

where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j2\pi f_k(t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, l) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
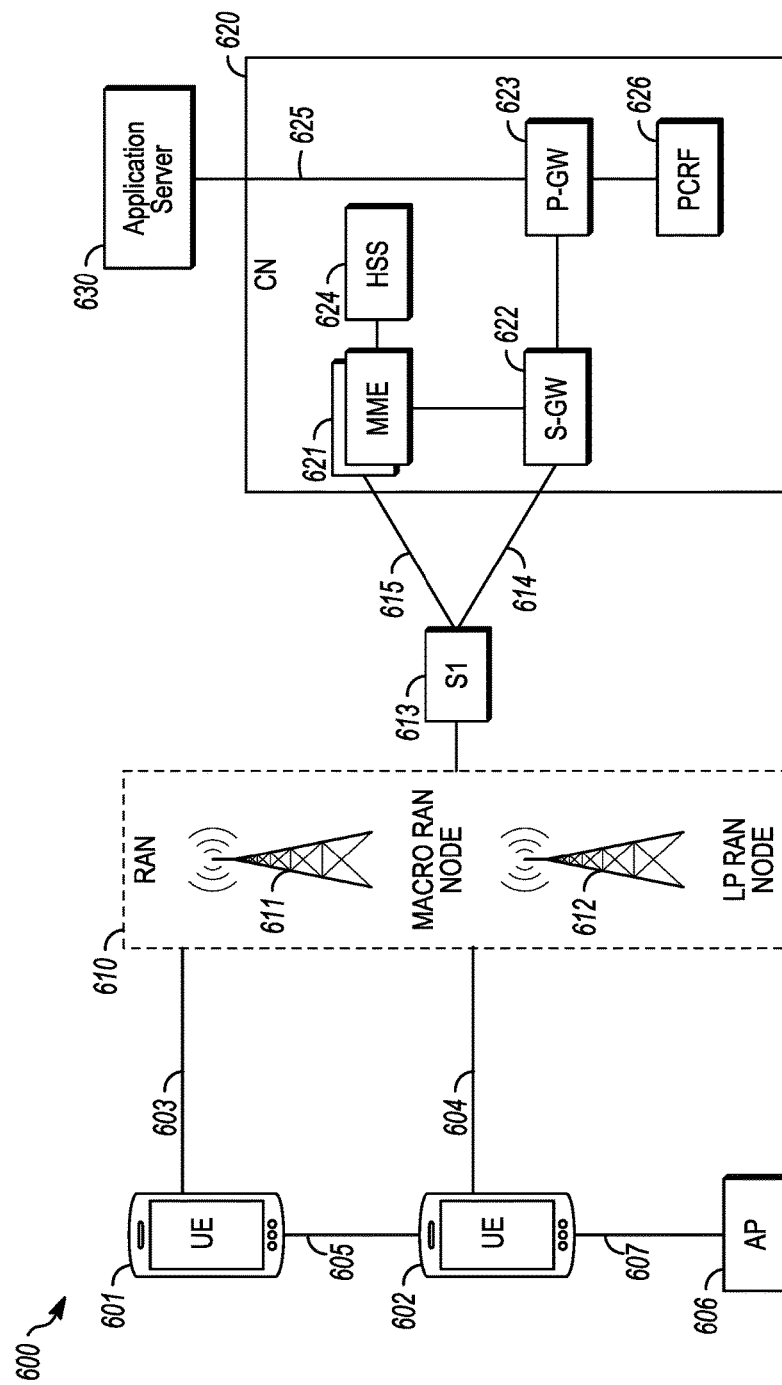
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

Figure 7:
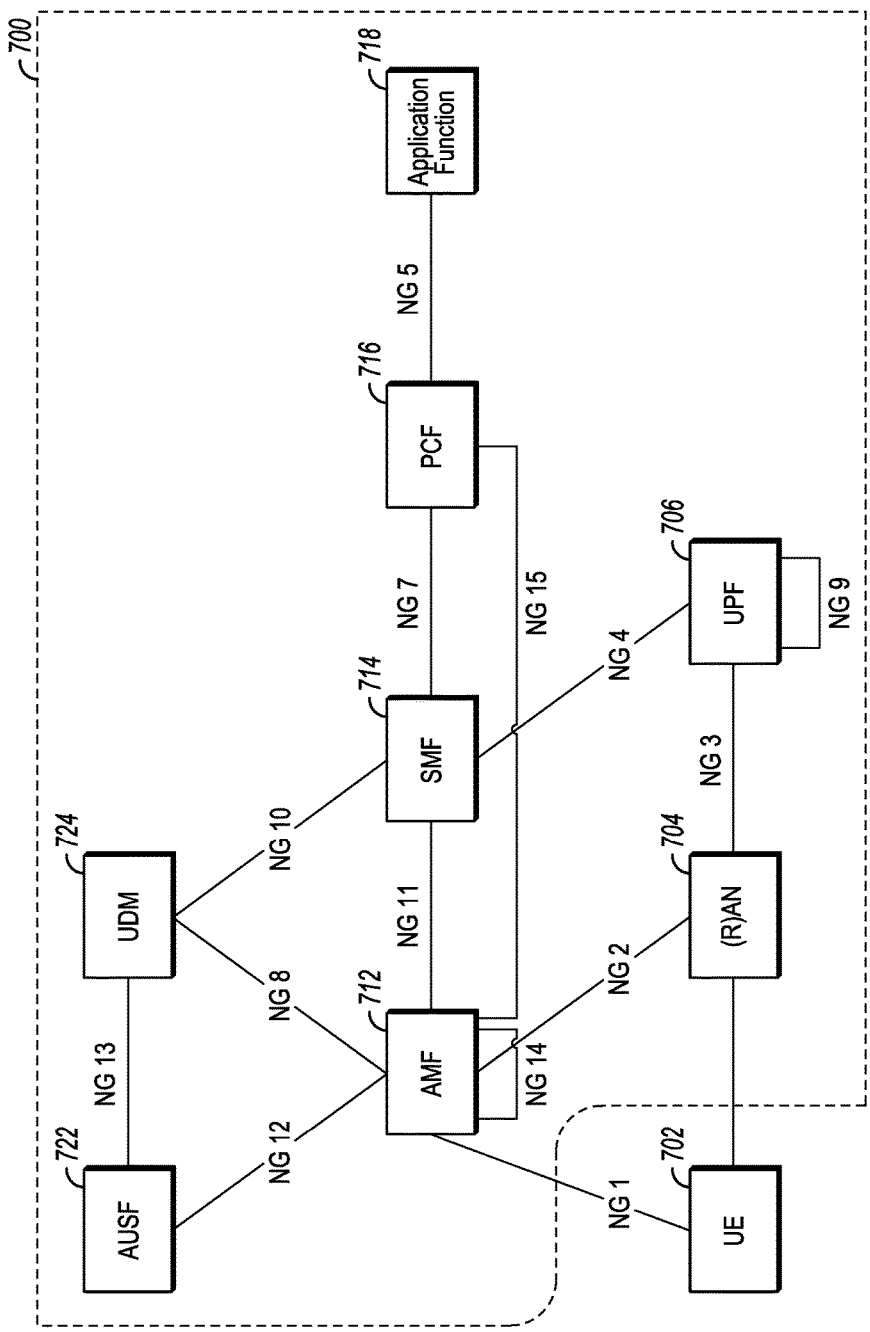
FIG. 7 illustrates 5G architecture in accordance with some embodiments.

The above discussion concentrates primarily on LTE networks, however, 5G networks will soon start to be deployed, leading to interoperability challenges. FIG. 7 illustrates 5G architecture in accordance with some embodiments. Some elements may not be shown for convenience. The 4G core network (EPC) contains, as above, protocol and reference points are defined for each entity such as the MME, S-GW, and P-GW. The 5G (next generation) architecture 700 as shown in FIG. 7 includes multiple network functions (NFs) and reference points connecting the network functions. A network function can be implemented as a discrete network element on a dedicated hardware, as a software instance running on dedicated hardware, or as a virtualized function instantiated on an appropriate platform, e.g., dedicated hardware or a cloud infrastructure.

In the 5G network 700, the control plane and the user plane may be separated, which may permit independent scaling and distribution of the resources of each plane. The UE 702 may be connected to either an access network or random access network (RAN) 704 and/or may be connected to an Access and Mobility Function (AMF) 712 of the 5G architecture 700. The RAN 704 may be an eNB or a general non-3GPP access point, such as that for Wi-Fi. The 5G core network may contain multiple network functions besides the AMF 712: a User Plane Function (UPF) 706, a Session Management Function (SMF) 714, a Policy Control Function (PCF) 716, an Application Function (AF) 718, an Authentication Server Function (AUSF) 722 and User Data Management (UDM) 724. The various elements are connected by the NG reference points shown in FIG. 7.

The AMF 712 may provide UE-based authentication, authorization, mobility management, etc. The AMF 712 may be independent of the access technologies. The SMF 714 may be responsible for session management and allocation of IP addresses to the UE 702. The SMF 714 may also select and control the UPF 706 for data transfer. The SMF 714 may be associated with a single session of the UE 702 or multiple sessions of the UE 702. This is to say that the UE 702 may have multiple 5G sessions. In some embodiments, different SMFs may be allocated to each session. The use of different SMFs may permit each session to be individually managed. As a consequence, the functionalities of each session may be independent of each other. The UPF 708 may be connected with a data network, with which the UE 702 may communicate, the UE 702 transmitting uplink data to or receiving downlink data from the data network.

The AF 718 may provide information on the packet flow to the PCF 716 responsible for policy control to support a desired QoS. The PCF 716 may set mobility and session management policies for the UE 702. To this end, the PCF 716 may use the packet flow information to determine the appropriate policies for proper operation of the AMF 712 and SMF 714. The AUSF 722 may store data for UE authentication. The UDM 724 may similarly store the UE subscription data.

Figure 8:
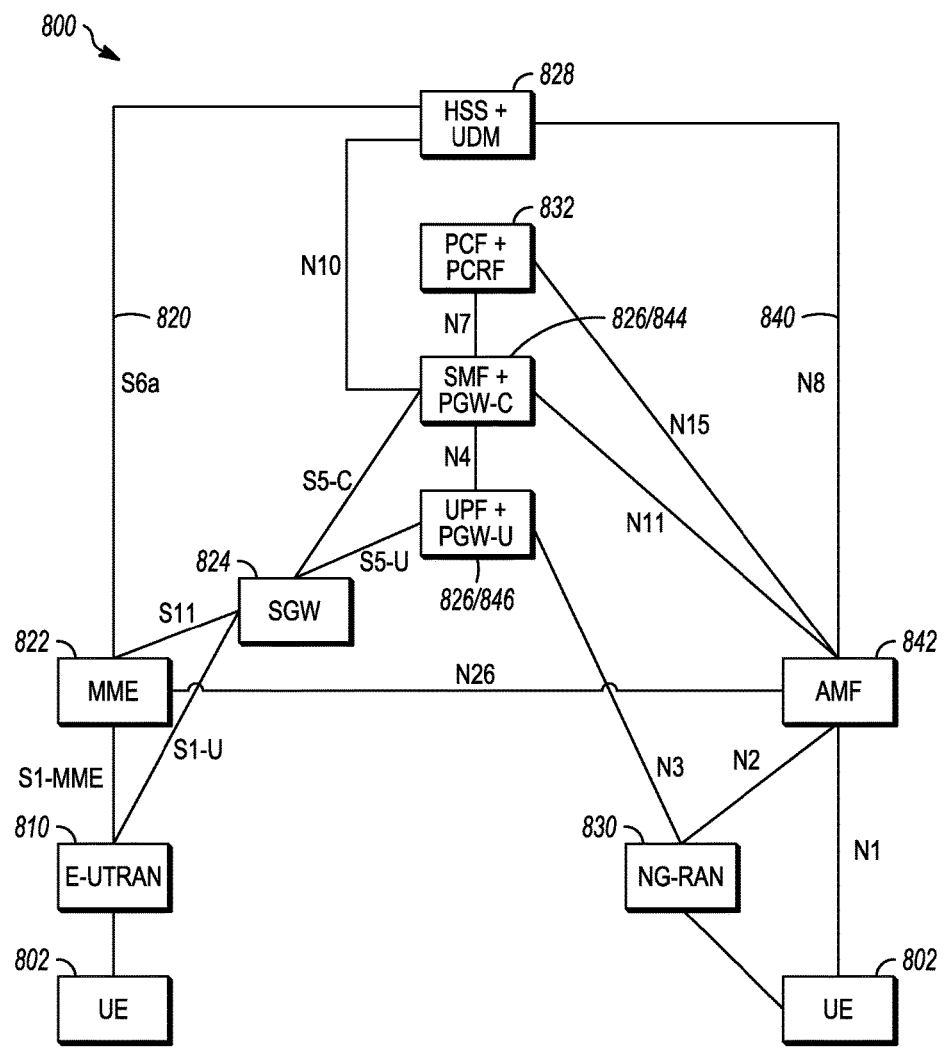
FIG. 8 illustrates combined communication system in accordance with some embodiments.

Due to the immediate lack of 5G UEs and 5G cells, interworking between the LTE architecture and 5G architecture, as well as UE registration with one or both systems, may be challenging. FIG. 8 illustrates combined communication system in accordance with some embodiments. The system 800 may include a UE 802 in communication with the E-U-TRAN (eNB) 810 and a NG-RAN (gNB) 830. The gNB may be a standalone gNB or a non-standalone gNB, e.g., operating in Dual Connectivity (DC) mode as a booster controlled by the eNB 810 through an X2 interface. The gNB 830 may, for example, provide additional capacity within a predetermined area inside the eNB 810.

At least some of functionality of the EPC 820 and the 5G CN 840 may be shared (alternatively, separate components may be used for each of the combined component shown). The eNB 810 may be connected with an MME 822 of the EPC 820 through an S1 interface and with a SGW 824 of the EPC 820 through an S1-U interface. The MME 822 may be connected with an HSS 828 through an S6a interface while the UDM is connected to the AMF 842 through the N8 interface. The SGW 824 may connected with the PGW 826 through an S5 interface (control plane PGW-C through S5-C and user plane PGW-U through S5-U). The PGW 826 may serve as an IP anchor for data through the internet.

The 5G CN 840, as above, may contain an AMF 842, SMF 844 and UPF 846, among others. The eNB 810 and gNB 830 may communicate data with the SGW 824 of the EPC 820 and the UPF 846 of the 5G CN 840. The MME 822 and the AMF 842 may be connected via the N26 interface to provide control information there between, if the N26 interface is supported by the EPC 820.

In some embodiments, when the gNB 830 is a standalone gNB, the 5G CN 840 and the EPC 820 may be connected via the N26 interface. This may permit mobility interoperability in both the connected state (e.g., handover) and idle state (e.g., cell (re)selection) as well as other types of interoperability, such as load balancing. The use of the N26 interface may also permit the UE context to be exchanged between the 5G CN 840 and the EPC 820 when the UE is capable of single common registration (registration with the 5G CN 840 or the EPC 820) rather than dual registration (with the 5G CN 840 and the EPC 820). When the UE 802 is capable of dual registration, transfer of the UE context between the 5G CN 840 and the EPC 820 may be avoided as the UE 802 may determine which network to use. The PCF and PCRF 832 may be combined and connected to the AMF 842 through the N15 interface.

In more detail, when the UE 802 is in single registration mode the UE 802 may have a single mobility management state. This state may be the EPS Mobility Management (EMM)-REGISTERED or DE-REGISTERED state in the EPC 820 or the Registration Management (RM)-REGISTERED or DE-REGISTERED state in the 5G CN 840. The UE 802 may be in the EPC/5G NAS mode, dependent on the CN.

In some cases, the UE 802 is in idle mode, and the N26 interface is supported by the EPC 820. In this case, when the UE 802 is being transferred from the 5G system to the 4G system, the AMF 842 may transfer the mobility management context to the MME 822 when the UE enters the EPC network from the 5G network. In the opposite case, the MME 822 may transfer the Single Network Slice Selection Assistance Information (S-NSSAI) associated with the PDN connections and mapping info to the AMF 842. When the N26 interface is not supported, the UE 802 may report the S-NSSAI received from the PGW 826 or SMF 844 to the MME 822 or the AMF 842.

In some cases, the UE is in connected mode, and the N26 interface is supported by the EPC 820. In this case, when the UE 802 is being transferred from the 5G system to the 4G system, the AMF 842 may select a target MME 822 and transfer the UE context over the N26 interface. After successful handover from the AMF 842 to the MME 822, a tracking area update may be performed. When the UE 802 is being transferred from the 4G system to the 5G system, the MME 822 may select the target AMF 842 based on the target location and transfer the UE context over the N26 interface. The PGW 826 may send the PDU Session IDs and related S-NSSAIs to the AMF 842. After successful handover, registration may be performed to secure the allowed N-SSAI.

In dual-registration mode, the UE 802 may be able to register with either or both the 5GC and EPC system. For mobility in dual-registration mode, support of the N26 interface may be avoided while in single-registration mode, either the N26 interface may or may not be used. Without the N26 interface, IP address continuity may be provided by storing and fetching information in the PGW/C+SMF and corresponding APN/DDN information via the HSS. In such networks, AMF may also provide an indication that interworking without the N26 interface is supported to UEs during initial 5G registration or the MME may provide an indication that interworking without the N26 interface is supported in the Attach procedure.

The mobility procedures for the UE thus may depend on whether the N26 interface is supported in the network and the UE mode of operation—Single Registration mode or Dual registration mode. It is desirable to enable the Single Registration mode to be used without support for the N26 interface as this may permit operators to deploy 5GC systems relatively quickly. By permitting this without N26 support, the operators when deploying 5GC systems may avoid deployment of the additional N26 hardware and software links for connecting with existing 4GS systems. In addition, enabling support for IP address continuity and session migration between 4GS and 5GS may allow operators to leverage the existing networks and support customers on to new 5GS systems in a phased manner, easing the adoption pains of new technology while rolling out new services.

However, support of interworking when the UE is in the single registration mode may be hampered somewhat by the requirements of the 3GPP standard. In case of 5GC-EPC interworking without the N26 interface and in single registration mode, for mobility of the UE from the 5GC (N1 mode) to the EPC (S1 mode), the UE may perform an Attach procedure in EPC with Request type "handover" in a PDN CONNECTIVITY Request message and subsequently move all other PDU sessions using the UE requested PDN connectivity establishment procedure with Request Type "handover" flag. However, the UE is already in the REGISTERED state in 5GC and hence EMM-REGISTERED state in EPC. The UE in the EMM-REGISTERED state may be unable to initiate the Attach procedure without breaking the 4G NAS state machine. Moreover, if UE moves to the DEREGISTERED state on 5GC then the UE may lose all session management context and PDU sessions. As such the single registration mode without the N26 interface cannot be supported as described in 3GPP TR 24.890 (ver 1.1.1) and in 3GPP TS 23.501 (ver 1.5.0).

To combat this, in some embodiments, before the UE initiates the registration procedure, the UE may handle the default EPS bearer contexts and PDU session contexts as if the N26 interface were supported, independent of whether the N26 interface is supported. If the network indicates in the REGISTRATION ACCEPT message that the N26 interface is not supported, the UE may modify the state of the PDU session contexts from active to inactive and continue with the procedures for intersystem change without the N26 interface.

In some basic embodiments, the UE merely attempts to act as if the N26 interface were supported during the transition. As the new core network may be unable to retrieve the session management contexts from the old core network, the UE may lose all its PDN connections or PDU sessions during the intersystem change. When the UE then attempts to re-establish its PDN connections/PDU sessions, the UE may generally obtain new IP addresses assigned. In some enhanced embodiments, the UE may perform specific procedures to preserve the IP addresses during the intersytem change.

During an intersytem change without the N26 interface, the new core network (EPC or 5GC) to which the UE is being transferred cannot retrieve the default EPS bearer contexts/PDU sessions from the old core network. In some embodiments, the UE may map 'active' PDU session contexts of the UE to default EPS bearer contexts (or vice versa) and set the state of the PDU (or EPS) contexts in the target system to 'inactive'—as a reminder that the context yet is to be activated. For 5GC to EPS intersystem change, when an EPS bearer context has been activated successfully, or when the procedure has finally failed, the UE may set the state of the EPS bearer context in the target system to 'active' and the state of the corresponding PDU session context to 'inactive'. For the reverse direction of intersystem change (EPS to 5GC) this applies vice versa.

Without the N26 interface, by setting the state of the EPS bearer context in the target system EPS to 'inactive', the UE can avoid the problem that normally, when the UE initiates an EPS attach procedure, the UE cannot have any EPS bearer contexts in state 'active'.

At the beginning of the EPS attach procedure, the UE may not have any EPS bearer contexts in the 'active' state, it is also assumed that before initiating the procedure, the UE may move locally to the EMM-DEREGISTERED state. This means that no modification of the EPS attach procedure may occur—that is the EPS attach procedure may be started, as usual, in the EMM-DEREGISTERED state, and at the beginning of the EPS attach procedure the UE may avoid having any EPS bearer contexts in the 'active' state.

Thus, if the UE is capable of N1 mode and S1 mode and if both 5GMM and EMM are enabled, a UE in the single-registration mode may maintain a common registration for 5GMM and EMM. In single-registration mode, for intersystem change between the 5GC and EPC, the UE behavior may depend on whether the N26 interface between the MME and the AMF is supported.

Figure 9:
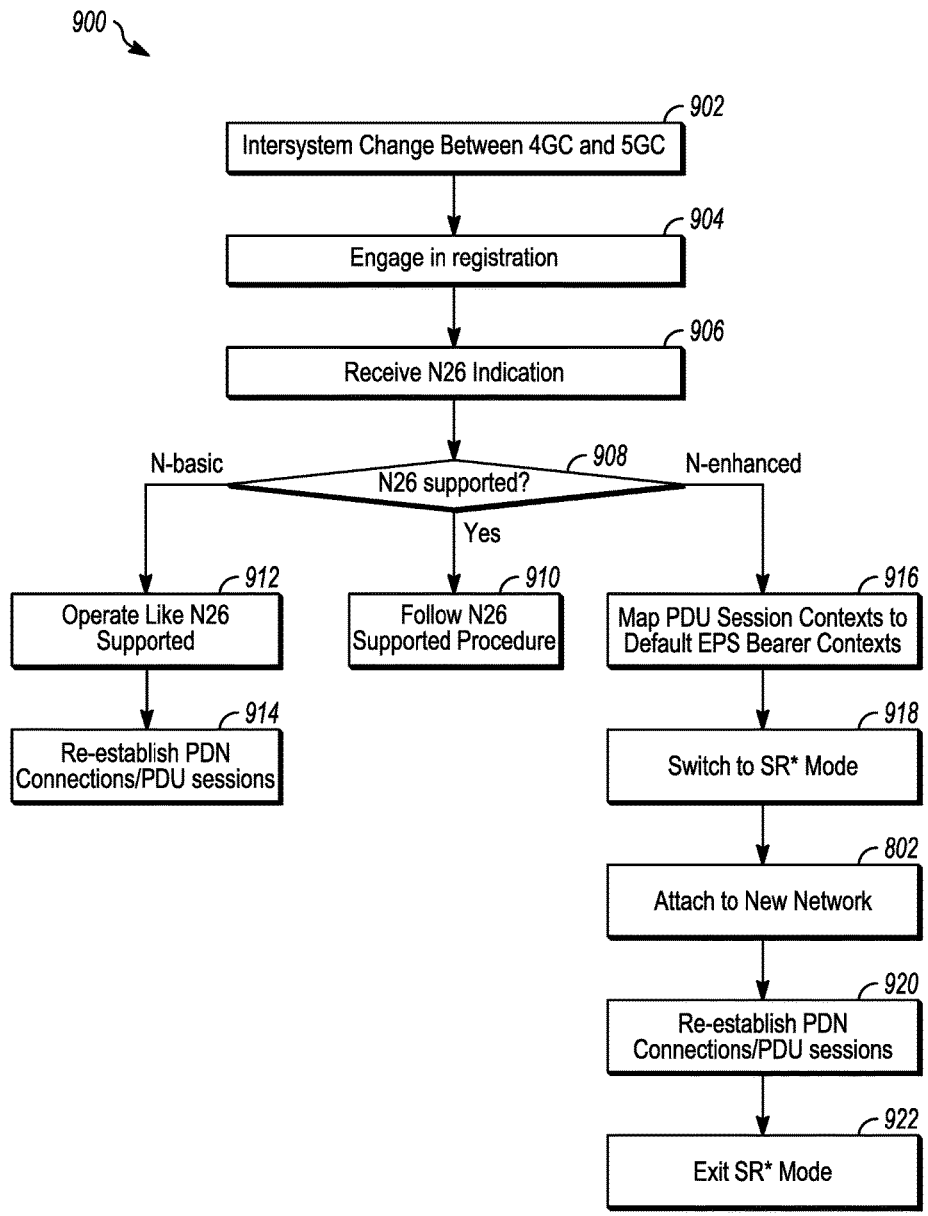
FIG. 9 illustrates a flowchart of an intersystem change in accordance with some embodiments.

FIG. 9 illustrates a flowchart of an intersystem change in accordance with some embodiments. Some of the operations described herein may not be shown in the intersystem change 900 of FIG. 9 for convenience. At operation 902, the UE may determine that an intersystem change is to occur S1 to N1 or N1 to S1.

Several operations may occur to permit the UE to determine whether the N26 interface is supported. When the UE performs the registration procedure in N1 mode at operation 904, the AMF may inform the UE whether or not dual-registration mode is supported at operation 906. The AMF may provide this indication using the REGISTRATION ACCEPT message. An indication that the dual-registration mode is supported is equivalent to an indication that the N26 interface is not supported. The UE may assume that the indication is valid for the entire PLMN. Thus, during an intersystem change from 5GC to EPS, the UE may be able to determine whether the N26 interface is supported at operation 908 and which coordination procedures below to follow.

Upon intersystem change from EPC to 5GC, the UE may initiate a mobility registration update procedure, regardless of whether or not the N26 interface is supported. If this is the first mobility registration update procedure after an EPS attach, the UE may assume that the N26 interface is supported and handle the mapping from EPS bearer contexts to PDU sessions accordingly. If the registration update request is accepted by the network, the UE can determine from the contents of the REGISTRATION ACCEPT message whether the N26 interface is supported and adapt its behavior if not. For all other cases of intersystem change from EPC to 5GC, the UE may already have determined from an earlier successful registration procedure in N1 mode whether the N26 interface is supported in the PLMN and respond accordingly.

If the UE is not registered, the UE may be in the 5GMM-DEREGISTERED state and in the EMM-DEREGISTERED state. In N1 mode, upon successful completion of a registration procedure, the UE operating in the single-registration mode may enter the 5GMM-REGISTERED.NORMAL-SERVICE and EMM-REGISTERED.NO-CELL-AVAILABLE substates. In S mode, upon successful completion of an attach or TAU procedure, the UE operating in the single-registration mode may enter the 5GMM-REGISTERED.NO-CELL-AVAILABLE and EMM-REGISTERED.NORMAL-SERVICE substates.

During an intersystem change from the S1 mode to N1 mode in 5GMM-IDLE mode, the UE may enter the 5GMM-REGISTERED.NORMAL-SERVICE state and the EMM-REGISTERED.NO-CELL-AVAILABLE state and initiate a mobility registration update procedure. The UE may include the PDU session status IE in the REGISTRATION REQUEST message. If the network indicates in the REGISTRATION ACCEPT message that the dual-registration mode is supported, then the network may not support the N26 interface and the UE may from this point owards follow the procedures specified in relation to the N26 interface not being supported.

During an intersystem change from the N1 mode to S1 mode in EMM-IDLE mode (when the UE supports non-IP PDN type and at least one PDU session is active or the UE does not support non-IP PDN type and at least one PDU session context of IPv4, IPv6 or IPv4v6 PDU session type is active), if no PDU session context is active, and the EMM-REGISTERED state without PDN connection is not supported by the UE or the MME, the UE may move to the 5GMM-DEREGISTERED state and the EMM-DEREGISTERED state and then initiate the attach procedure. If the EMM-REGISTERED state without PDN connection is supported by the UE and the MME, the UE may move to the EMM-REGISTERED.NORMAL-SERVICE state and the 5GMM-REGISTERED.NO-CELL-AVAILABLE state and initiate a TAU procedure.

During an intersystem change from the N1 mode to S1 mode in EMM-IDLE mode, when at least one PDU session context is active, the UE may move to the EMM-REGISTERED.NORMAL-SERVICE state and the 5GMM-REGISTERED.NO-CELL-AVAILABLE state and initiate a TAU procedure. If the UE initiates a TAU procedure, the UE may include the EPS bearer context status IE in the TRACKING AREA UPDATE REQUEST message.

During an intersystem change from S1 mode to N1 mode in CMM-IDLE mode, the UE may map each default EPS bearer context in the BEARER CONTEXT ACTIVE or BEARER CONTEXT MODIFY PENDING state to a PDU session context in the PDU SESSION ACTIVE state. If the network indicates in the REGISTRATION ACCEPT message that "dual-registration mode is supported", then the network does not support the N26 interface and the UE may from this point towards handle the EPS bearer contexts and PDU session contexts as specified in relation to the N26 interface not being supported. During an intersystem change from N1 mode to S1 mode in EMM-IDLE mode, the UE may map each PDU session context in the PDU SESSION ACTIVE or PDU SESSION MODIFICATION PENDING state to a default EPS bearer context in the BEARER CONTEXT ACTIVE state. The UE may map any other PDU session context to a default EPS bearer context in the BEARER CONTEXT INACTIVE state.

For single-registration mode without N26 interface, the UE may support a basic option or an enhanced option. For the basic option, the UE may behave as in single-registration mode with N26 interface at operation 912. During an intersystem change from S1 mode to N1 mode in CMM-IDLE mode, when the UE initiates a mobility registration update procedure, the AMF may not be able to resolve the 5G-GUTI mapped from a 4G-GUTI and received with the REGISTRATION REQUEST message or to retrieve the subscriber context from the old MME. The AMF may therefore handle the request as an initial registration request, including in the REGISTRATION ACCEPT message an indication that "dual-registration mode is supported" and a PDU session status IE indicating all PDU sessions as inactive. The UE may then re-establish any previously established PDU session(s) at operation 914, for which in some cases user interaction may occur. During an intersystem change from intersystem change from N1 mode to S1 mode in EMM-IDLE mode, if the UE initiates a TAU procedure, the MME may not be able to resolve the old GUTI received with the TRACKING AREA UPDATE REQUEST message or to retrieve the subscriber context from the old AMF. The MME may therefore reject the request with EMM cause #9 "UE identity cannot be derived by the network." In response, the UE may enter the EMM-DEREGISTERED state and initiate an attach procedure. As above, IP address(es) can generally not be preserved if PDN connections or PDU sessions are to be re-established after intersystem change in the target system.

For the enhanced option, the UE can perform procedures that enable IP address preservation if PDN connections or PDU sessions are to be re-established after intersystem change in the target system. The UE actions upon intersystem change may deviate both from the actions for single-registration mode with N26 interface described and from the actions for single-registration mode without N26 interface described in the basic option. Specifically, the UE may map PDU session contexts to default EPS bearer contexts at operation 916. The UE may then temporarily switch to an alternative registration mode when an intersystem change occurs at operation 918. This alternative mode is referred to as "single-registration* (SR*)" mode. While the UE is in the SR* mode, the UE can temporarily have different registration states in the S1 mode and N1 mode, and the UE can have one or more default EPC contexts active in the EPC and one or more PDU sessions active in the 5GC at the same time. Once the UE has successfully completed the EPS attach or mobility registration update procedure in the target system at operation 920 and transferred all PDU sessions or PDN connections, if any, to the target system, the UE may switch back to (regular) single-registration mode at operation 924 after re-establishing any previously established PDU session(s) at operation 922 (for which in some cases user interaction may occur).

Coordination between 5GMM and EMM for the enhanced option may use certain procedures only for a UE supporting single-registration mode without N26 interface when the enhanced option is used. In N1 mode, upon successful completion of a registration procedure, the UE operating in the single-registration mode or SR* mode may enter the 5GMM-REGISTERED.NORMAL-SERVICE and EMM-REGISTERED.NO-CELL-AVAILABLE substates.

In S1 mode, upon successful completion of an attach or TAU procedure, the UE operating in the single-registration mode or SR* mode may enter the 5GMM-REGISTERED.NO-CELL-AVAILABLE and EMM-REGISTERED.NORMAL-SERVICE substates. At an intersystem change from S1 mode to N1 mode in the 5GMM-IDLE mode, the UE may enter the 5GMM-REGISTERED.NORMAL-SERVICE and EMM-REGISTERED.NO-CELL-AVAILABLE states. If the UE knows that dual-registration mode is supported by the network, the UE may switch to SR* mode and start timer Tsr. If the UE is already operating in SR* mode and timer Tsr is already running, the UE may stop the timer and restart the timer Tsr with the initial value of 10 minutes. The UE may then initiate the mobility registration update procedure and include the PDU session status IE in the REGISTRATION REQUEST message. If this is the first mobility registration update procedure after an EPS attach, the UE had at least one default EPS bearer context in state BEARER CONTEXT ACTIVE or BEARER CONTEXT MODIFY PENDING before the intersytem change, and the UE receives a REGISTRATION ACCEPT message indicating that "dual-registration mode is supported", then the UE may switch to SR* mode and start timer Tsr.

Upon successful completion of the mobility registration update procedure, the UE actions may depend on whether default EPS bearer contexts exist. If the UE did not have any default EPS bearer contexts in the BEARER CONTEXT ACTIVE or BEARER CONTEXT MODIFY PENDING state before the intersytem change, then upon successful completion of the attach procedure the UE may switch to single-registration mode and stop timer Tsr. However, if the UE had at least one default EPS bearer context in state BEARER CONTEXT ACTIVE or BEARER CONTEXT MODIFY PENDING before the intersytem change, then the UE may perform PDU session re-establishment for the PDU sessions. Upon receiving an indication from the 5GSM that all PDU sessions have been handled, the UE may switch back from SR* mode to single-registration mode and stop timer Tsr.

At intersystem change from N1 mode to S1 mode in the EMM-IDLE mode, the UE may switch to SR* mode and start timer Tsr. If the UE is already operating in SR* mode and timer Tsr is already running, the UE may stop the timer and restart the timer Tsr with its initial value. The UE may enter the EMM-DEREGISTERED.NORMAL-SERVICE state, stay in the 5GMM-REGISTERED.NO-CELL-AVAILABLE state and initiate the EPS attach procedure. The UE actions may then depend on whether default EPS bearer contexts exist. If the UE did not have any PDU session context in the PDU SESSION ACTIVE or PDU SESSION MODIFICATION PENDING state, then upon successful completion of the attach procedure the UE may switch back from SR* mode to single-registration mode and stop timer Tsr. If the UE had at least one PDU session context in the PDU SESSION ACTIVE or PDU SESSION MODIFICATION PENDING state, then the UE may activate its default EPS bearer context(s). Upon reception of an indication from the EPS Session Management (ESM) that all default EPS bearer contexts have been handled, the UE may switch back from SR* mode to single-registration mode and stop timer Tsr.

In S1 mode, while the UE is operating in SR* mode, the outcome of any EMM procedure affect only one or a few the 5GMM parameters, with most of the parameters such as the 5GMM state, 5G-GUTI, TAI list, etc. being unaffected. However, if, as a result of an EMM procedure, the UE sets the EPS update status to EU2 NOT UPDATED or EU3 ROAMING NOT ALLOWED, then the UE may also set the 5GMM update status to NOT UPDATED or ROAMING NOT ALLOWED, respectively. Similarly, in N1 mode, while the UE is operating in SR* mode, the outcome of any 5GMM procedure may not affect the EMM parameters such as EMM state, 4G-GUTI, TAI list, etc., with one exception. Similar to the above, if as a result of a 5GMM procedure, the UE sets the 5GMM update status to NOT UPDATED or ROAMING NOT ALLOWED, then the UE may also set the EPS update status to EU2 NOT UPDATED or EU3 ROAMING NOT ALLOWED, respectively.

If the UE performs an intersystem change back from S1 mode to N1 mode while operating in SR* mode, and the UE successfully activated any default EPS bearer context with request type "handover" while in S1 mode, the UE may act as indicated above with respect to the intersystem change from S1 mode to N1 mode. However, if the UE did not successfully activate any default EPS bearer context with request type "handover" while in S1 mode, the UE may initiate a mobility registration update procedure and include its 5G-GUTI and the PDU session status IE in the REGISTRATION REQUEST message.

If the UE performs an intersystem change back from N1 mode to S1 mode while operating in SR* mode, and the UE successfully activated any PDU session context with request type "existing PDU session" while in N1 mode, the UE may act as indicated above with respect to the intersystem change from N1 mode to S1 mode. However, if the UE did not successfully activate any PDU session context with request type "existing PDU session" while in N1 mode, the UE may initiate a TAU procedure and include the 4G-GUTI of the UE and the EPS bearer context status IE in the TRACKING AREA UPDATE REQUEST message.

Upon expiry of timer Tsr, the UE may switch back from SR* mode to single registration mode. Additionally, if the UE is in S1 mode, the UE may set any PDU session contexts to state inactive. The UE may synchronize the 5GMM state with the EMM state in the following way: if the UE is in state EMM-DEREGISTERED or EMM-REGISTERED, then the UE may set the 5GMM state to the corresponding value. If the UE is in any of the states EMM-REGISTERED-INITIATED, EMM-SERVICE-REQUEST-INITIATED, EMM-TRACKING-AREA-UPDATING-INITIATED or EMM-DEREGISTERED-INITIATED, the UE may synchronize the 5GMM state with the EMM state when the UE enters EMM-DEREGISTERED or EMM-REGISTERED, respectively. If the UE is in N1 mode, the UE may set any default EPS bearer contexts to state inactive. The UE may synchronize the EMM state with the 5GMM state in the following way: if the UE is in the 5GMM-DEREGISTERED or 5GMM-REGISTERED state, then the UE may set the 5EMM state to the corresponding value. If the UE is in any of the states 5GMM-REGISTERED-INITIATED, 5GMM-SERVICE-REQUEST-INITIATED or 5GMM-DEREGISTERED-INITIATED, the UE may synchronize the EMM state with the 5GMM state when the UE enters 5GMM-DEREGISTERED or 5GMM-REGISTERED, respectively.

Coordination between 5GSM and ESM for the enhanced option may use certain procedures only for a UE supporting single-registration mode without N26 interface when the enhanced option is used and if the UE has at least one PDU session or default EPS bearer context active in the source system before the intersystem change.

At an intersystem change from S1 mode to N1 mode in CMM-IDLE mode, if this is the first mobility registration update procedure after an EPS attach, then before initiating the mobility registration update procedure the UE may map each default EPS bearer context as indicated above. Upon receipt of an indication from the 5GMM that the UE is operating in SR* mode, the UE may set the states of all PDU session contexts to PDU SESSION INACTIVE. If this is not the first mobility registration update procedure after an EPS attach, then before initiating the mobility registration update procedure the UE may map each default EPS bearer context in state BEARER CONTEXT ACTIVE or BEARER CONTEXT MODIFY PENDING to a PDU session context in state PDU SESSION INACTIVE. Upon receipt of an indication that the UE is operating in SR* mode, the UE may attempt to activate each of the mapped PDU sessions by initiating the PDU session establishment procedure with request type set to "existing PDU session". For each PDU session the UE may set the state of the corresponding default EPS bearer context to inactive, when the PDU session has been activated successfully, or when the PDU session establishment procedure was rejected by the network or aborted by the UE. When all PDU sessions have been handled, 5GSM may indicate this to 5GMM.

At intersystem change from N1 mode to S1 mode in EMM-IDLE mode, the UE may deactivate any EPS bearer contexts locally and map each PDU session context in state PDU SESSION ACTIVE or PDU SESSION MODIFICATION PENDING to a default EPS bearer context in state BEARER CONTEXT INACTIVE. The UE can have EPS bearer contexts in an active state, if the UE performed an intersystem change to N1 mode and returned to S1 mode before the UE could transfer all default EPS bearer contexts to the 5GC.

During the EPS attach procedure, to activate one of these default EPS bearer contexts, the UE may include a PDN CONNECTIVITY REQUEST message with request type set to "handover" in the ATTACH REQUEST message. After successful completion of the attach procedure, the UE may attempt to activate each of the other default EPS bearer contexts, if any, by initiating a stand-alone PDN connectivity procedure with request type set to "handover". For each default EPS bearer context the UE may set the state of the corresponding PDU session to inactive, when the EPS bearer context has been activated successfully, or when the PDN connectivity procedure was rejected by the network or aborted by the UE. When all default EPS bearer contexts have been handled, the ESM may indicate this to EMM.

Thus, as indicated above, the UE may migrate between the 4G and 5G systems even when no physical interconnect connects the 4G and 5G systems. The two systems may interwork in Single Registration mode without the N26 interface. The UE may determine whether the N26 interface is supported by the system to which the UE is attached based on a message from the 4G or 5G system. The UE may determine whether the N26 interface is supported during the mobility registration update procedure after an EPS Attach and may adapt its behavior accordingly. Before the UE initiates the registration procedure, the UE may handle default EPS bearer contexts and PDU session contexts as if the N26 interface were supported.

At inter-system change from N1 mode to S1 mode in EMM-IDLE mode when the UE supports non-IP PDN type and at least one PDU session is active or the UE does not support non-IP PDN type and at least one PDU session context of IPv4, IPv6 or IPv4v6 PDU session type is active, the UE may undertake several actions. These actions are predicated on the UE supporting sending an ATTACH REQUEST message containing a PDN CONNECTIVITY REQUEST message with request type set to "handover" to transfer a PDU session from N1 mode to S1 mode and the UE having received an interworking without N26 supported indication from the network. The UE may enter substates EMM-DEREGISTERED.NORMAL-SERVICE and 5GMM-REGISTERED.NO-CELL-AVAILABLE, map each PDU session supporting interworking to EPS to the default EPS bearer context of the corresponding PDN connection(s) and set the state of each default EPS bearer context, and initiate an EPS attach procedure and include a PDN Connectivity Request message with request type set to "handover" in the Attach Request message to activate a default EPS bearer context for one of the active PDU session contexts. After successful completion of the EPS attach procedure, the UE may attempt to activate each of the other default EPS bearer contexts, if any, by initiating a stand-alone PDN connectivity procedure with request type set to "handover" in the PDN CONNECTIVITY REQUEST message. If the UE does not support transmission of the Attach Request message or has not received the N26 message, the UE may instead enter substates EMM-REGISTERED.NORMAL-SERVICE and 5GMM-REGISTERED.NO-CELL-AVAILABLE and initiate a TAU procedure.

In particular, when the SMF does not provide the UE with the mapped EPS bearer context for a PDU session context, the UE in EMM-IDLE mode may be unaware whether interworking to EPS is supported for a PDU session before attempting to transfer the PDU session context from N1 to S1. The UE may thus use parameters from each PDU session context which the UE intends to transfer to EPS to create the contents of a PDN CONNECTIVITY REQUEST message. Among other parameters, the request type may be set to "handover" for non-emergency communications and the PDU session type of the PDU session context mapped as "non-IP", "IPv4", "IPv6" or "IPv4v6" dependent on the context. The UE may afterwards associate the PDU session identity with the default EPS bearer context. Upon successful completion of an attach procedure after inter-system change from N1 mode to S1 mode, the UE may delete UE-derived QoS rules. The MME may not provide the UE with the mapped PDU session context for a PDN connection. When establishing a new PDN connection in S1 mode, if the UE wants to be able to attempt to transfer the PDN connection from S1 mode to N1 mode, the UE similar to the above may allocate a PDU session identity, indicate the allocated PDU session identity in the PDU session ID parameter in the PCO IE of the PDN CONNECTIVITY REQUEST and associate the allocated PDU session identity with the default EPS bearer context of the PDN connection.

At inter-system change from N1 mode to S1 mode in EMM-IDLE mode when the UE supports non-IP PDN type and no PDU session is active or the UE does not support non-IP PDN type and no PDU session context of IPv4, IPv6 or IPv4v6 PDU session type is active, the UE may undertake several actions. These actions may include the UE entering substates EMM-DEREGISTERED.NORMAL-SERVICE and 5GMM-DEREGISTERED.NO-CELL-AVAILABLE, and initiating an attach procedure.

Similarly, at inter-system change from S1 mode to N1 mode in 5GMM-IDLE mode, the UE may enter substate 5GMM-REGISTERED.NORMAL-SERVICE and substate EMM-REGISTERED.NO-CELL-AVAILABLE, map the default EPS bearer context(s) of the PDN connection(s), if any, to the corresponding PDU session(s) and set the state of each PDU session, and initiate the registration procedure for mobility and periodic registration update indicating "mobility registration updating" in the 5GS registration type IE of the REGISTRATION REQUEST message.

After having successfully registered in N1 mode the UE may, if the UE supports the PDU session establishment procedure with request type set to "existing PDU session" to transfer a PDN connection from S1 mode to N1 mode and the UE has received an "interworking without N26 supported" indication from the network, attempt to transfer all existing PDN connections, if any, from S1 mode to N1 mode by initiating the PDU session establishment procedure with request type set to "existing PDU session." Otherwise the UE may establish PDU sessions corresponding to all existing PDN connections, if any, by initiating the PDU session establishment procedure with request type set to "initial request".

Similarly, upon an inter-system change from S1 mode to N1 mode in 5GMM-IDLE mode, the UE may use the parameters from the default EPS bearer context of each PDN connection which the UE intends to transfer to 5GS and for which the UE has allocated a PDU session identity to create a PDU SESSION ESTABLISHMENT REQUEST message. The PDN type of the of the default EPS bearer context may be mapped to the PDU session type of the PDU session context in the same manner as that above.

As described in another manner, one of two options may be supported by the UE. In a 'basic' option, the UE may merely attempt to act as if the N26 interface were supported. As the new core network (EPC or 5GC) may not be able to retrieve the session management contexts from the old core network (5GC or EPC), the UE may lose all the PDN connections or PDU sessions during the intersystem change. When the UE then attempts to re-establish the PDN connections/PDU sessions, the UE may have new IP addresses assigned by the target (new core) network. During an intersytem change (N1 mode to S1 mode or S1 mode to N1 mode) without the N26 interface, the new core network may be unable retrieve the default EPS bearer contexts/PDU sessions from the old core network, and hence the UE may map the 'active' PDU session contexts to default EPS bearer contexts (or vice versa) and set the state of the contexts in the target system to 'inactive'—as a reminder that the context yet is to be activated. For 5GC to EPS intersystem change, only when an EPS bearer context has been activated successfully (or when the procedure has finally failed), may the UE set the state of the EPS bearer context in the target system to 'active' and the state of the corresponding PDU session context to 'inactive'. For the reverse direction of intersystem change this applies vice versa.

If at the beginning of the EPS attach procedure, the UE does not have any EPS bearer contexts in state 'active', then before initiating the EPS attach procedure the UE may move locally to the EMM-DEREGISTERED state. This may avoid change to the fundamental principles in TS 24.301 that an EPS attach procedure can only be started in EMM-DEREGISTERED, and at the beginning of the EPS attach procedure the UE cannot have any EPS bearer contexts in the 'active' state.

The UE may stay in the 5GMM-REGISTERED state and keep the PDU session contexts in 5G in the 'active' state until the PDU session contexts have been transferred to the 4GS. Thus, for the time until the EPS attach procedure is completed, the registration states in the UE may be temporarily 'out-of-sync'. However, this may just be in line with the status on the network side, because the MME does not have any subscriber context for the UE and the MME may also not be able to retrieve subscriber context from anywhere other than the HSS. Also during the attach procedure, there is no strict state synchronization between the EMM and the 5GMM state machines in the UE, as the UE may immediately change to EMM-REGISTERED-INITIATED and stay there until the attach procedure is completed.

The EPS attach to 4GS may rejected (e.g. with EMM cause #13 or #15, or with other causes with or without EMM back-off timer), or the EPS attach can be delayed (e.g. by access class barring) or fail for various reasons (loss or radio connection, T3410 timer expiry, etc.). To avoid rejection for these cases, the PDU sessions (and the related IP addresses) may be lost before they can be transferred to the EPC, the mobility management state machines may be 'isolated' partially in the sense that the outcome of an EMM procedure like EPS attach may not affect the 5GMM parameters like 5GMM state, 5G-GUTI, TAI list, etc. Only the EPS update status may be mapped to the respective 5GMM update status to ensure that if the UE returns to N1 mode, the return may trigger a mobility registration update procedure even if the UE returns to a 5G tracking area which is included in its (5G-)TAI list. The registration to 5GS may be rejected or delayed and the same partial 'isolation' of state machines may be applied as above. When all the PDN connections/PDU sessions have been successfully transferred to the target system, the isolation between the state machines can be removed.

For the specific mode in which the EMM and 5GMM state machine are 'isolated' partially, the UE may be considered to be operating in "single-registration* (SR*)" mode. In this mode the UE behaviour may be different from the behaviour in single-registration mode with the N26 interface interface (in so far as in SR* mode, upon intersystem change to S1 mode the UE may perform an EPS attach instead of TAU, and upon intersystem change in both directions the UE may map session management contexts to corresponding contexts in the target system in 'active' state), and different from the behaviour in single-registration mode without the N26 interface interface for that UE implementation option where the UE also attempts to act as if in single-registration mode with the N26 interface interface.

In some cases, the UE may change back, e.g. from S1 mode to N1 mode, before all the PDU sessions have been successfully transferred to the EPC. Assuming that after the previous intersystem change to S1 mode the UE started with transferring the 'most important' PDU session first (typically the session for IMS), the UE may be most concerned with getting that PDU session back to the 5GC. So if the UE changes back to N1 mode and at least one PDU session has been transferred successfully, the UE may again initiate a mobility registration update procedure for intersystem change (i.e. using the 4G-GUTI as UE identity). If the UE changes back to N1 mode before transfer of any PDU session to the EPC (e.g. because access class barring was active in E-UTRAN), then the UE may initiate a mobility registration update procedure using its 5G-GUTI as UE identity, trying to resume the old configuration in N1 mode.

For the reverse direction, i.e., a 'premature' change back from N1 mode to S1 mode when the first EPS bearer context has already been transferred to 5GC, the UE may initiate an EPS attach procedure and consequently lose the default EPS bearer contexts which could not be transferred (as the MME may deactivate these contexts locally when receiving the ATTACH REQUEST message). If the change back occurs before the UE is able to transfer any default EPS bearer context to the 5GC, then the UE may initiate a TAU procedure using the 4G-GUTI as UE identity, trying to resume the old configuration in S1 mode.

The intersystem change without the N26 interface and with IP address preservation may supervised with a timer. The timer may have a default value of e.g. 10 minutes. When the timer expires, the UE may terminate transfer of the appropriate bearers.

As above, a UE operating in the single-registration mode that is not registered may be in the EMM-DEREGISTERED state and in the 5GMM-DEREGISTERED state. In N1 mode, upon successful completion of a registration procedure, the UE may enter the 5GMM-REGISTERED.NORMAL-SERVICE substate and the EMM-REGISTERED.NO-CELL-AVAILABLE substate. At an intersystem change from N1 to S1 in 5GMM-IDLE mode, the UE acts as above; in S1 mode, upon successful completion of an attach or tracking area updating procedure, the UE operating may enter the substates: 5GMM-REGISTERED.NO-CELL-AVAILABLE and EMM-REGISTERED.NORMAL-SERVICE. At inter-system change from S1 to N1 in 5GMM-IDLE mode, the UE may enter the substates: EMM-REGISTERED.NO-CELL-AVAILABLE and 5GMM-REGISTERED.NORMAL-SERVICE and then initiate the registration procedure for mobility and periodic registration update indicating "mobility registration updating" in the 5GS registration type IE of the REGISTRATION REQUEST message.

EXAMPLES

Example 1 is an apparatus of a user equipment (UE), the apparatus comprising: processing circuitry, wherein the UE is configured for operation in either a single registration mode or for operation in a dual registration mode, wherein a common registration for Evolved Packet System (EPS) Mobility Management (EMM) of an evolved packet core network (EPC) and 5th generation Mobility Management (5GMM) of a core network (5GC) is maintained in the single registration mode, the EPC is accessed in an S1 mode and the 5GC is accessed in an N1 mode; during an intersystem change from N1 mode to S1 mode, the processing circuitry is arranged to, prior to performance of an Attach procedure, map a protocol data unit (PDU) session context to a default EPS bearer context of a packet data network (PDN) connection and set a state of the default EPS bearer context, wherein: the default EPS bearer context is activated during the Attach procedure by transmission of a PDN CONNECTIVITY REQUEST message with request type set to "handover", or the default EPS bearer context is activated after the Attach procedure is performed by initiation of a standalone PDN connectivity procedure with request type set to "handover" in another PDN CONNECTIVITY REQUEST message; and during an intersystem change from S1 mode to N1 mode, the processing circuitry is arranged to map a default EPS bearer context of the PDN connection to a corresponding PDU session and set a state of the PDU session, wherein after the state of the PDU session is set, a mobility registration update procedure is performed with the 5GC, and, after registration in the N1 mode, a PDU session establishment procedure with request type set to "existing PDU session" is initiated to transfer the PDN connection; and a memory arranged to store the mapped EPS bearer context.

In Example 2, the subject matter of Example 1 includes, mode: enter substates 5GMM-REGISTERED.NORMAL-SERVICE and EMM-REGISTERED.NO-CELL-AVAILABLE prior to mapping the PDU session.

In Example 3, the subject matter of Example 2 includes, wherein processing circuitry is further arranged to: decode an indication of support for interworking without an N26 interface, the indication received before the PDU session establishment procedure is initiated.

In Example 4, the subject matter of Example 3 includes, wherein: the Attach procedure is performed after reception of the indication, and a tracking area update (TAU) procedure is performed if the indication is not received.

In Example 5, the subject matter of Example 4 includes, wherein the processing circuitry is further arranged to: during the intersystem change from N1 mode to S1 mode: enter substates EMM-DEREGISTERED.NORMAL-SERVICE and 5GMM-REGISTERED.NO-CELL-AVAILABLE after reception of the indication and prior to mapping the PDU session; and enter substates EMM-REGISTERED.NORMAL-SERVICE and 5GMM-REGISTERED.NO-CELL-AVAILABLE prior to initiation of the TAU procedure.

In Example 6, the subject matter of Examples 1-5 includes, wherein the processing circuitry is further arranged to: determine support for interworking without an N26 interface from reception of an indicator from one of the EPC or 5GC, start a timer after initiation of the Attach or mobility registration update procedure, and stop the timer upon whichever of completion of the Attach or mobility registration update procedure or expiration of the timer occurs first, wherein upon expiration of the timer all default EPS bearer contexts are transferred or all PDU sessions are terminated.

In Example 7, the subject matter of Examples 1-6 includes, wherein the processing circuitry comprises: a baseband processor configured to encode transmissions to, and decode transmissions from, at least one of the EPC and 5GC.

Example 8 is a computer-readable storage medium that stores instructions for execution by one or more processors of a user equipment (UE), the one or more processors to configure the UE to, when the instructions are executed: operate in a single registration mode in which the UE maintains a common registration for Evolved Packet System (EPS) Mobility Management (EMM) of an evolved packet core network (EPC) and 5th generation Mobility Management (5GMM) of a core network (5GC); access the EPC in an S1 mode and access the 5GC in an N1 mode; during an intersystem change from N1 mode to S1 mode: perform an Attach procedure or tracking area update (TAU) procedure with the EPC, if the Attach procedure is performed: prior to performance of the Attach procedure, map a protocol data unit (PDU) session context to a default EPS bearer context of a packet data network (PDN) connection and set a state of the default EPS bearer context, and during or after the Attach procedure is performed, activate the default EPS bearer context; and during an intersystem change from S1 mode to N1 mode: map a default EPS bearer context of the PDN connection to a corresponding PDU session and set a state of the PDU session; initiate a mobility registration update procedure with the 5GC, and initiate a PDU session establishment procedure with request type set to "existing PDU session" to transfer the PDN connection.

In Example 9, the subject matter of Example 8 includes, wherein the instructions, when executed, further configure the UE to: initiate the intersystem change from S1 mode to N1 mode in 5GMM-IDLE mode; and initiate the intersystem change from N1 mode to S1 mode in EMM-IDLE mode if at least one PDU session context is active.

In Example 10, the subject matter of Example 9 includes, mode: perform the Attach procedure when support transmission of a PDN Connectivity Request message with request type set to "handover" in an Attach Request message is supported, and perform the TAU procedure when the transmission of the PDN Connectivity Request message with request type set to "handover" in the Attach Request message is not supported.

In Example 11, the subject matter of Example 10 includes, wherein the instructions, when executed, further configure the UE to: perform the Attach procedure after reception of an indication of support for interworking without an N26 interface, and perform the TAU procedure if the indication is not received.

In Example 12, the subject matter of Example 11 includes, mode: enter substates EMM-DEREGISTERED.NORMAL-SERVICE and 5GMM-REGISTERED.NO-CELL-AVAILABLE after reception of the indication and prior to mapping the PDU session; and enter substates EMM-REGISTERED.NORMAL-SERVICE and 5GMM-REGISTERED.NO-CELL-AVAILABLE prior to initiation of the TAU procedure.

In Example 13, the subject matter of Examples 9-12 includes, mode: enter substates 5GMM-REGISTERED.NORMAL-SERVICE and EMM-REGISTERED.NO-CELL-AVAILABLE prior to mapping the PDU session.

In Example 14, the subject matter of Example 13 includes, wherein the instructions, when executed, further configure the UE to: initiate the mobility registration update procedure after mapping the default EPS bearer context.

In Example 15, the subject matter of Example 14 includes, wherein the instructions, when executed, further configure the UE to: initiate the PDU session establishment procedure, with request type set to "existing PDU session", to transfer a PDN connection from S1 mode to N1 mode after reception of an indication of support for interworking without an N26 interface.

In Example 16, the subject matter of Examples 8-15 includes, wherein the instructions, when executed, further configure the UE to: determine support for interworking without an N26 interface from reception of an indicator from one of the EPC or 5GC, initiate the Attach or mobility registration update procedure, start a timer after initiation of the Attach or mobility registration update procedure, and stop the timer upon whichever of completion of the Attach or mobility registration update procedure or expiration of the timer occurs first, wherein upon expiration of the timer all default EPS bearer contexts are transferred or all PDU sessions are terminated.

In Example 17, the subject matter of Examples 8-16 includes, wherein the instructions, when executed, further configure the UE to: perform the Attach procedure without breaking a 4G non-access stratum (NAS) state machine, independent of whether the EPC supports an N26 interface.

In Example 18, the subject matter of Examples 8-17 includes, wherein the instructions, when executed, further configure the UE to: after the Attach procedure is performed, activate the default EPS bearer context by initiating a stand-alone PDN connectivity procedure with request type set to "handover" in a PDN CONNECTIVITY REQUEST message.

In Example 19, the subject matter of Examples 8-18 includes, wherein the instructions, when executed, further configure the UE to: during the Attach procedure, activate the default EPS bearer context by transmission of a PDN CONNECTIVITY REQUEST message with request type set to "handover".

Example 20 is an apparatus of a user equipment (UE), the apparatus comprising: processing circuitry, wherein the UE is configured for operation in either a single registration mode or for operation in a dual registration mode, wherein, when configured for operation in the single registration mode in which the processing circuitry configures the UE to maintain a common registration for Evolved Packet System (EPS) Mobility Management (EMM) of an evolved packet core network (EPC) and 5th generation Mobility Management (5GMM) of a core network (5GC), the processing circuitry is arranged to configure the UE to: determine whether interworking without an N26 interface being supported exists based on an indication from the EPC or 5GC; if the indication indicates that interworking without the N26 interface is supported, during an intersystem change from N1 mode to S1 mode map a protocol data unit (PDU) session to a default EPS bearer context of a packet data network (PDN) connection and set a state of the default EPS bearer context, an Attach procedure initiated thereafter, or if the indication indicates that interworking without the N26 interface is not supported, a tracking area update (TAU) procedure is performed; and during the intersystem change from S1 mode to N1 mode, map the default EPS bearer context of the PDN connection to a corresponding PDU session and set the state of the PDU session, a registration procedure for mobility and periodic registration update indicating "mobility registration updating" being initiated thereafter; and a memory arranged to store a mapping of the PDU session to the default EPS bearer context.

In Example 21, the subject matter of Example 20 includes, wherein: during the intersystem change from N1 mode to S1 mode, each default EPS bearer context is activated by initiation of a stand-alone PDN connectivity procedure with request type set to "handover" in a PDN CONNECTIVITY REQUEST message; and during the intersystem change from S1 mode to N1 mode, all existing PDN connections are transferred by initiation of a PDU session establishment procedure with request type set to "existing PDU session".

In Example 22, the subject matter of Examples 20-21 includes, mode: enter substates 5GMM-REGISTERED.NORMAL-SERVICE and EMM-REGISTERED.NO-CELL-AVAILABLE prior to mapping the PDU session.

In Example 23, the subject matter of Examples 20-22 includes, mode: enter substates EMM-DEREGISTERED.NORMAL-SERVICE and 5GMM-REGISTERED.NO-CELL-AVAILABLE after reception of the indication and prior to mapping the PDU session; and enter substates EMM-REGISTERED.NORMAL-SERVICE and 5GMM-REGISTERED.NO-CELL-AVAILABLE prior to initiation of the TAU procedure.

Example 24 is at least one machine-readable medium including instructions that, when executed by processing circuitry, cause the processing circuitry to perform operations to implement of any of Examples 1-23.

Example 25 is an apparatus comprising means to implement of any of Examples 1-23.

Example 26 is a system to implement of any of Examples 1-23.

Example 27 is a method to implement of any of Examples 1-23.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of a user equipment (UE), the apparatus comprising:
   processing circuitry, wherein the UE is configured for operation in either a single registration mode or for operation in a dual registration mode,
   wherein a common registration for Evolved Packet System (EPS) Mobility Management (EMM) of an evolved packet core network (EPC) and 5th generation Mobility Management (5GMM) of a core network (5GC) is maintained in the single registration mode, the EPC is accessed in an S1 mode and the 5GC is accessed in an N1 mode;
   during an intersystem change from N1 mode to S1 mode, the processing circuitry is arranged to, prior to performance of an Attach procedure, map a protocol data unit (PDU) session context to a default EPS bearer context of a packet data network (PDN) connection and set a state of the default EPS bearer context, wherein:
      the default EPS bearer context is activated during the Attach procedure by transmission of a PDN CONNECTIVITY REQUEST message with request type set to "handover", or
      the default EPS bearer context is activated after the Attach procedure is performed by initiation of a stand-alone PDN connectivity procedure with request type set to "handover" in another PDN CONNECTIVITY REQUEST message; and
   during an intersystem change from S1 mode to N1 mode, the processing circuitry is arranged to map a default EPS bearer context of the PDN connection to a corresponding PDU session and set a state of the PDU session,
      wherein after the state of the PDU session is set, a mobility registration update procedure is performed with the 5GC, and, after registration in the N1 mode, a PDU session establishment procedure with request type set to "existing PDU session" is initiated to transfer the PDN connection; and
   a memory arranged to store the mapped EPS bearer context.

2. The apparatus of claim 1, wherein the processing circuitry is further arranged to, during the intersystem change from S1 mode to N1 mode:
   enter substates 5GMM-REGISTERED.NORMAL-SERVICE and EMM-REGISTERED.NO-CELL-AVAILABLE prior to mapping the PDU session.

3. The apparatus of claim 2, wherein processing circuitry is further arranged to:
   decode an indication of support for interworking without an N26 interface, the indication received before the PDU session establishment procedure is initiated.

4. The apparatus of claim 3, wherein:
   the Attach procedure is performed after reception of the indication, and
   a tracking area update (TAU) procedure is performed if the indication is not received.

5. The apparatus of claim 4, wherein the processing circuitry is further arranged to:
   during the intersystem change from N1 mode to S1 mode:
      enter substates EMM-DEREGISTERED.NORMAL-SERVICE and 5GMM-REGISTERED.NO-CELL-AVAILABLE after reception of the indication and prior to mapping the PDU session; and
      enter substates EMM-REGISTERED.NORMAL-SERVICE and 5GMM-REGISTERED.NO-CELL-AVAILABLE prior to initiation of the TAU procedure.

6. The apparatus of claim 1, wherein the processing circuitry is further arranged to:
   determine support for interworking without an N26 interface from reception of an indicator from one of the EPC or 5GC,
   start a timer after initiation of the Attach or mobility registration update procedure, and
   stop the timer upon whichever of completion of the Attach or mobility registration update procedure or expiration of the timer occurs first,
   wherein upon expiration of the timer all default EPS bearer contexts are transferred or all PDU sessions are terminated.

7. The apparatus of claim 1, wherein the processing circuitry comprises:
   a baseband processor configured to encode transmissions to, and decode transmissions from, at least one of the EPC and 5GC.

8. A non-transitory computer-readable storage medium that stores instructions for execution by one or more processors of a user equipment (UE), the one or more processors to configure the UE to, when the instructions are executed:
   operate in a single registration mode in which the UE maintains a common registration for Evolved Packet System (EPS) Mobility Management (EMM) of an evolved packet core network (EPC) and 5th generation Mobility Management (5GMM) of a core network (5GC);

access the EPC in an S1 mode and access the 5GC in an N1 mode; during an intersystem change from NI mode to SI mode:

perform an Attach procedure or tracking area update (TAU) procedure with the EPC, if the Attach procedure is performed:

prior to performance of the Attach procedure, map a protocol data unit (PDU) session context to a default EPS bearer context of a packet data network (PDN) connection and set a state of the default EPS bearer context, and during or after the Attach procedure is performed, activate the default EPS bearer context; and during an intersystem change from SI mode to N1 mode:

map a default EPS bearer context of the PDN connection to a corresponding PDU session and set a state of the PDU session;

initiate a mobility registration update procedure with the 5GC, and initiate a PDU session establishment procedure with request type set to "existing PDU session" to transfer the PDN connection.

9. The medium of claim 8, wherein the instructions, when executed, further configure the UE to:

initiate the intersystem change from S1 mode to N1 mode in 5GMM-IDLE mode; and initiate the intersystem change from N1 mode to S1 mode in EMM-IDLE mode if at least one PDU session context is active.

10. The medium of claim 9, wherein the instructions, when executed, further configure the UE to, when at least one PDU session is active, during the intersystem change from N1 mode to S1 mode:

perform the Attach procedure when support transmission of a PDN Connectivity Request message with request type set to "handover" in an Attach Request message is supported, and perform the TAU procedure when the transmission of the PDN Connectivity Request message with request type set to "handover" in the Attach Request message is not supported.

11. The medium of claim 10, wherein the instructions, when executed, further configure the UE to:

perform the Attach procedure after reception of an indication of support for interworking without an N26 interface, and perform the TAU procedure if the indication is not received.

12. The medium of claim 11, wherein the instructions, when executed, further configure the UE to during the intersystem change from N1 mode to S1 mode:

enter substates EMM-DEREGISTERED.NORMAL-SERVICE and 5GMM-REGISTERED.NO-CELL-AVAILABLE after reception of the indication and prior to mapping the PDU session; and enter substates EMM-REGISTERED.NORMAL-SERVICE and 5GMM-REGISTERED.NO-CELL-AVAILABLE prior to initiation of the TAU procedure.

13. The medium of claim 9, wherein the instructions, when executed, further configure the UE to, during the intersystem change from S1 mode to N1 mode:

enter substates 5GMM-REGISTERED.NORMAL-SERVICE and EMM-REGISTERED.NO-CELL-AVAILABLE prior to mapping the PDU session.

14. The medium of claim 13, wherein the instructions, when executed, further configure the UE to:

initiate the mobility registration update procedure after mapping the default EPS bearer context.

15. The medium of claim 14, wherein the instructions, when executed, further configure the UE to:

initiate the PDU session establishment procedure, with request type set to "existing PDU session", to transfer a PDN connection from S1 mode to N1 mode after reception of an indication of support for interworking without an N26 interface.

16. The medium of claim 8, wherein the instructions, when executed, further configure the UE to:

determine support for interworking without an N26 interface from reception of an indicator from one of the EPC or 5GC, initiate the Attach or mobility registration update procedure, start a timer after initiation of the Attach or mobility registration update procedure, and stop the timer upon whichever of completion of the Attach or mobility registration update procedure or expiration of the timer occurs first, wherein upon expiration of the timer all default EPS bearer contexts are transferred or all PDU sessions are terminated.

17. The medium of claim 8, wherein the instructions, when executed, further configure the UE to:

perform the Attach procedure without breaking a 4G non-access stratum (NAS) state machine, independent of whether the EPC supports an N26 interface.

18. The medium of claim 8, wherein the instructions, when executed, further configure the UE to:

after the Attach procedure is performed, activate the default EPS bearer context by initiating a stand-alone PDN connectivity procedure with request type set to "handover" in a PDN CONNECTIVITY REQUEST message.

19. The medium of claim 8, wherein the instructions, when executed, further configure the UE to:

during the Attach procedure, activate the default EPS bearer context by transmission of a PDN CONNECTIVITY REQUEST message with request type set to "handover".

20. An apparatus of a user equipment (UE), the apparatus comprising:

processing circuitry, wherein the UE is configured for operation in either a single registration mode or for operation in a dual registration mode, wherein, when configured for operation in the single registration mode in which the processing circuitry configures the UE to maintain a common registration for Evolved Packet System (EPS) Mobility Management (EMM) of an evolved packet core network (EPC) and 5th generation Mobility Management (5GMM) of a core network (5GC), the processing circuitry is arranged to configure the UE to:

determine whether interworking without an N26 interface being supported exists based on an indication from the EPC or 5GC;

if the indication indicates that interworking without the N26 interface is supported, during an intersystem change from N1 mode to S1 mode map a protocol data unit (PDU) session to a default EPS bearer context of a packet data network (PDN) connection and set a state of the default EPS bearer context, an Attach procedure initiated thereafter, or if the indication indicates that interworking without the N26 interface is not supported, a tracking area update (TAU) procedure is performed; and during the intersystem change from S1 mode to N1 mode, map the default EPS bearer context of the PDU connection to a corresponding PDU session and set the state of the PDU session, a registration procedure for mobility and periodic registration update indicating "mobility registration updating" being initiated thereafter; and a memory arranged to store a mapping of the PDU session to the default EPS bearer context.

21. The apparatus of claim 20, wherein:

during the intersystem change from N1 mode to S1 mode, each default EPS bearer context is activated by initiation of a stand-alone PDN connectivity procedure with request type set to "handover" in a PDN CONNECTIVITY REQUEST message; and during the intersystem change from S1 mode to N1 mode, all existing PDN connections are transferred by initiation of a PDU session establishment procedure with request type set to "existing PDU session".

22. The apparatus of claim 20, wherein the processing circuitry is further arranged to, during the intersystem change from S1 mode to N1 mode:

enter substates 5GMM-REGISTERED.NORMAL-SERVICE and EMM-REGISTERED.NO-CELL-AVAILABLE prior to mapping the PDU session.

23. The apparatus of claim 20, wherein the processing circuitry is further arranged to during the intersystem change from N1 mode to S1 mode:

enter substates EMM-DEREGISTERED.NORMAL-SERVICE and 5GMM-REGISTERED.NO-CELL-AVAILABLE after reception of the indication and prior to mapping the PDU session; and enter substates EMM-REGISTERED.NORMAL-SERVICE and 5GMM-REGISTERED.NO-CELL-AVAILABLE prior to initiation of the TAU procedure.

* * * * *